(12) United States Patent
Vaysse et al.

(10) Patent No.: US 8,346,467 B2
(45) Date of Patent: Jan. 1, 2013

(54) DEVICE FOR DETECTING AN EVENT IN A VEHICLE OR IN THE SURROUNDS OF A VEHICLE

(75) Inventors: Bertrand Vaysse, Tournefeuille (FR); Laurent Satge, Aureville (FR); Frédéric Cantie, Toulouse (FR); Karim Bendhia, Colomiers (FR)

(73) Assignee: Continental Automotive France, Toulouse (FR)

( * ) Notice: Subject to any disclaimer, the term of this patent is extended or adjusted under 35 U.S.C. 154(b) by 856 days.

(21) Appl. No.: 12/301,260

(22) PCT Filed: Mar. 26, 2007

(86) PCT No.: PCT/EP2007/002644
§ 371 (c)(1),
(2), (4) Date: Dec. 16, 2008

(87) PCT Pub. No.: WO2007/134664
PCT Pub. Date: Nov. 29, 2007

(65) Prior Publication Data
US 2009/0164072 A1    Jun. 25, 2009

Related U.S. Application Data

(60) Provisional application No. 60/801,360, filed on May 18, 2006.

(30) Foreign Application Priority Data

Jul. 25, 2006  (FR) ...................... 06 06775

(51) Int. Cl.
*G06F 17/00* (2006.01)
*G06G 7/78* (2006.01)
*G08G 1/16* (2006.01)

(52) U.S. Cl. ..................................... 701/301

(58) Field of Classification Search ............... 701/49, 701/301; 340/5.72, 426.28, 426.36, 540, 340/542, 547, 562, 545.1
See application file for complete search history.

(56) References Cited

U.S. PATENT DOCUMENTS
4,571,884 A * 2/1986 Hetmann et al. ............... 49/72
(Continued)

FOREIGN PATENT DOCUMENTS
DE    43 25 501    2/1995
(Continued)

OTHER PUBLICATIONS
International Search Report dated Aug. 10, 2007 from corresponding PCT application.
(Continued)

*Primary Examiner* — Khoi Tran
*Assistant Examiner* — Harry Oh
(74) *Attorney, Agent, or Firm* — Young & Thompson

(57) ABSTRACT

A roof-cleaning device for moving side windows of a convertible vehicle an appropriate distance clear of a roof hinged to the vehicle body, and capable of detecting an event in or in the surroundings of the vehicle, includes:
  a first motion detector designed to occupy a first operational state and a second standby state,
  and a second detector coupled to the first detector and of lower power consumption, wherein
  I. with the first detector in the standby state, if the second detector detects an event to which it is sensitive, then the first detector switches into the operational state so that it can play a part in moving the window clear of the roof,
  II. and if, while in this operational state, the first detector detects the presence, intervention or action of the individual, then the windows are rolled down before the door is, or can be, opened.

10 Claims, 2 Drawing Sheets

U.S. PATENT DOCUMENTS

| | | | |
|---|---|---|---|
| 5,381,065 A | 1/1995 | Jones | |
| 6,075,294 A * | 6/2000 | Van den Boom et al. | ... 307/10.1 |
| 6,243,022 B1 | 6/2001 | Furukawa | |
| 6,441,512 B1 * | 8/2002 | Jakel et al. | ... 307/10.2 |
| 6,700,475 B1 * | 3/2004 | Geber et al. | ... 340/5.61 |
| 6,809,630 B1 * | 10/2004 | Dreimann et al. | ... 340/5.62 |
| 6,980,672 B2 * | 12/2005 | Saito et al. | ... 382/124 |
| 6,998,968 B2 * | 2/2006 | Garnault et al. | ... 340/426.28 |
| 7,049,940 B2 * | 5/2006 | Ieda et al. | ... 340/425.5 |
| 7,106,172 B2 * | 9/2006 | Neveux et al. | ... 340/5.72 |
| 7,402,917 B2 * | 7/2008 | Gehin | ... 307/9.1 |
| 7,501,936 B2 * | 3/2009 | Zagler | ... 340/426.1 |
| 2004/0031908 A1 * | 2/2004 | Neveux et al. | ... 250/221 |
| 2004/0217601 A1 * | 11/2004 | Garnault et al. | ... 292/336.3 |
| 2006/0186992 A1 | 8/2006 | Freyholdt et al. | |

FOREIGN PATENT DOCUMENTS

| | | | |
|---|---|---|---|
| DE | 100 52 308 | | 5/2002 |
| DE | 101 39 886 | | 11/2003 |
| EP | 0 076 960 | | 4/1983 |
| EP | 0076960 | * | 4/1983 |
| EP | 1 143 092 | | 10/2001 |
| EP | 1 160 400 | | 12/2001 |
| EP | 1 447 775 | | 8/2004 |
| EP | 1 450 489 | | 8/2004 |
| EP | 1447775 A2 | * | 8/2004 |
| EP | 1450489 A1 | * | 8/2004 |
| FR | 2 817 581 | | 6/2002 |
| WO | 2004/063504 | | 7/2004 |
| WO | 2005/073929 | | 8/2005 |

OTHER PUBLICATIONS

French Search Report dated Sep. 24, 2007, from corresponding French application.

* cited by examiner

DEVICE FOR DETECTING AN EVENT IN A VEHICLE OR IN THE SURROUNDS OF A VEHICLE

The invention relates to the field of detectors, particularly for the automotive environment.

It relates more specifically to a device for detecting an event in a vehicle or in the surroundings of a vehicle.

SUMMARY OF THE INVENTION

In general, a problem acknowledged in the present invention is concerned with improving existing detection systems to make it possible simultaneously to achieve better detection effectiveness and improved performance.

One proposed solution is for the detection device to comprise:

a first motion detector of the contactless type, and a second proximity or contact detector coupled to the first detector and of lower power consumption than this first detector, each detector being sensitive to the presence or to an action of an individual capable of bringing about said event.

Thus, by combining these first and second detectors it will be possible simultaneously to give the device high performance and achieve an appreciably reduction in electrical power consumption, thus at the same time making the device easier to incorporate and to run into the equipment.

As a preference, provision is made for the first detector to be designed to occupy two states:

an first operational state in which it triggers, or is ready to trigger, an operation following an activation instruction it receives via the second detector, and a second standby state which it occupies after a predetermined first period of time for which it has remained in its first operational state.

A preferred application of the device of the invention therefore relates to the field of motor vehicles, particularly that of convertibles.

This is because the solution of the invention will make it possible to bring a satisfactory solution to the issue of safely opening the side doors in spite of the fact that, typically, the side windows with which these doors are equipped fit into grooves in the roof when the vehicle is closed up and the doors and their windows are so also, thus presenting a problem with opening these doors.

More specifically, in this context, the invention proposes that:

a) with the first detector in a standby state, if the second detector detects, within the surroundings of the vehicle, an intervention, then the first detector switches into a suitable operational status so that it can play a part in moving the window clear of the roof, b) and if, while it is in this operational state, the first detector detects said presence, intervention or action of said individual, then the windows are rolled down before the door is, or can be, opened.

BRIEF DESCRIPTION OF THE DRAWINGS

Other features and advantages of the invention will become more further apparent hereinafter in the detailed description given of a preferred embodiment with reference to the attached drawings which, by way of example, show.

DETAILED DESCRIPTION OF THE PREFERRED EMBODIMENTS

Figure 1:
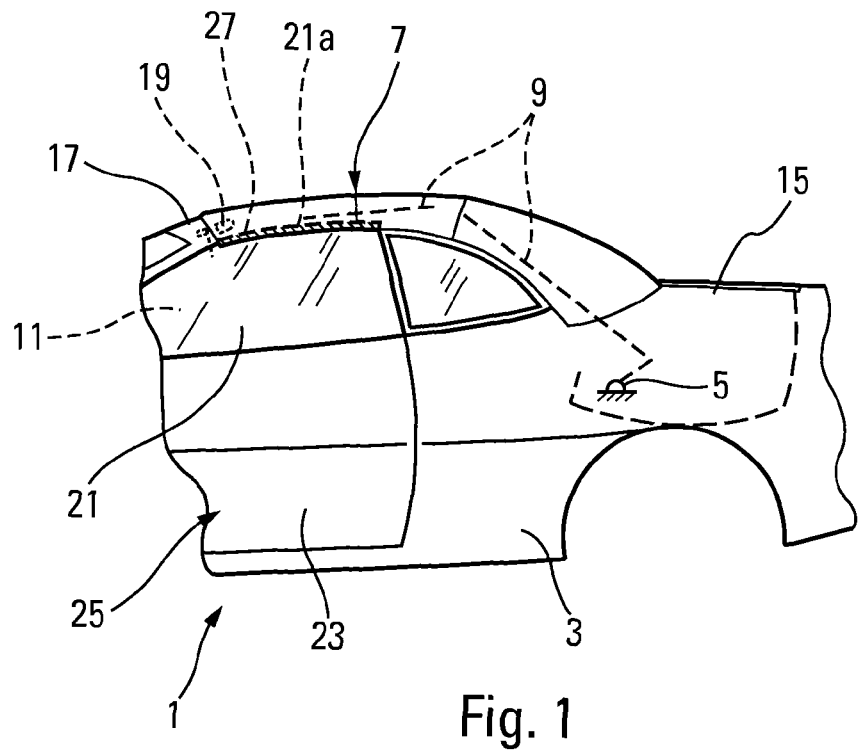
in FIG. 1, a partial external side view of a convertible, here shown with the roof up and the side door closed, in FIG. 2, the same vehicle with the side window illustrated appearing down slightly thus allowing the corresponding door to be safely opened, and, in FIG. 3, the same view of the same vehicle, still in its "roof down" state, the roof having been stored in the rear storage space set aside for this and the side window illustrated being shown entirely free to be rolled up and down.

In FIG. 1, the illustrated part of the vehicle 1 shows a body 3 to which a roof 7 is hinged, particularly at 5, it being possible for this roof to be operated by hinging and pivoting means 9 which have not been detailed.

Figure 3:
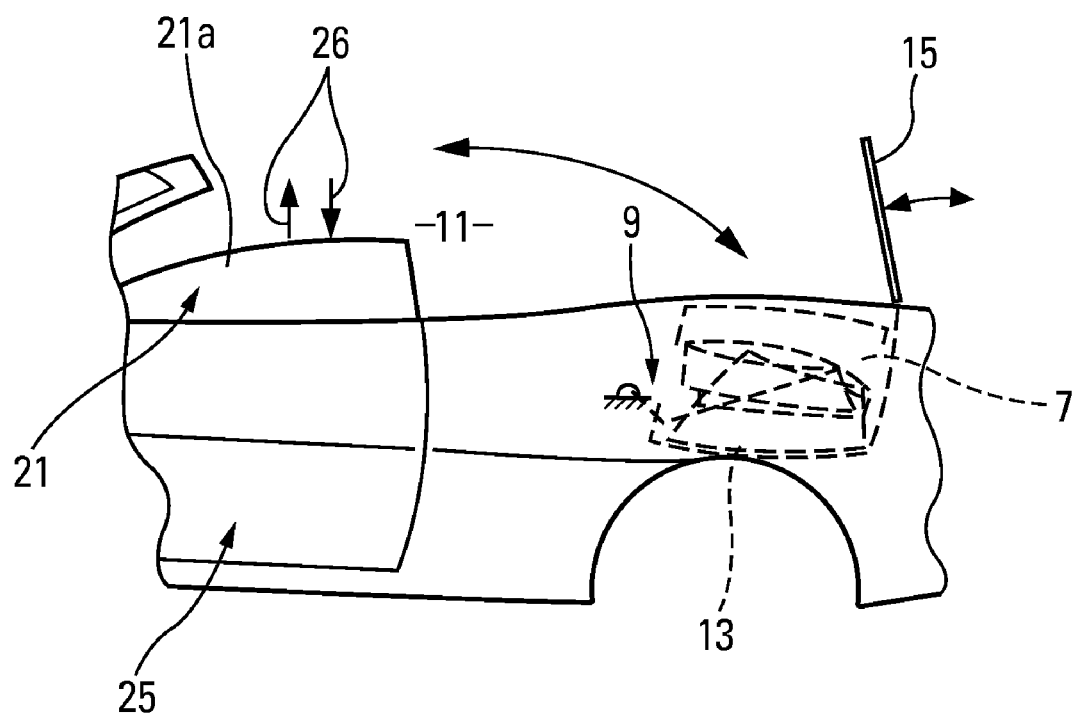

If FIGS. 1 and 3 are compared, it can be seen that these hinging and pivoting means 9 allow the hinged roof 7 to pivot in several sections between a first state (FIG. 1) closed up over the passenger compartment 11 of the vehicle and a roof-down second, opened, state (FIG. 3) in which the roof 7 is folded and stored inside a storage space 13 situated behind the passenger compartment 11 under a rear cover 15.

The cover 15 may in particular consist of a "tonneau cover" pivotably mounted on the body 3 of the vehicle, as can be seen by comparing FIGS. 1 and 3.

When the roof 7 is in its first, up state, i.e. with the roof over the passenger compartment, these various parts are deployed and it stretches forward as far as the upper transverse windshield aperture 17 to which it is locked, detachably, by a latching system depicted schematically as 19.

In this first, roof-up position, the roof 7 therefore extends in particular over the side windows of the vehicle and, in particular, the left window 21 depicted here, which can be rolled up and down relative to the frame 23 with the corresponding door 25 designed to accept it, as shown by the arrows 26 in FIG. 3.

Again in FIG. 1, it can be seen that when the roof 7 is in the first, roof-up state, the upper part 21a of the window 21 enters a lateral groove 27, such a groove being formed along each of the lateral edges of the roof to accept the relevant upper edge of the window of each side door of the window so that when the roof is up it is watertight in particular, thus preventing any ingress of moisture into the passenger compartment in this region.

Figure 2:
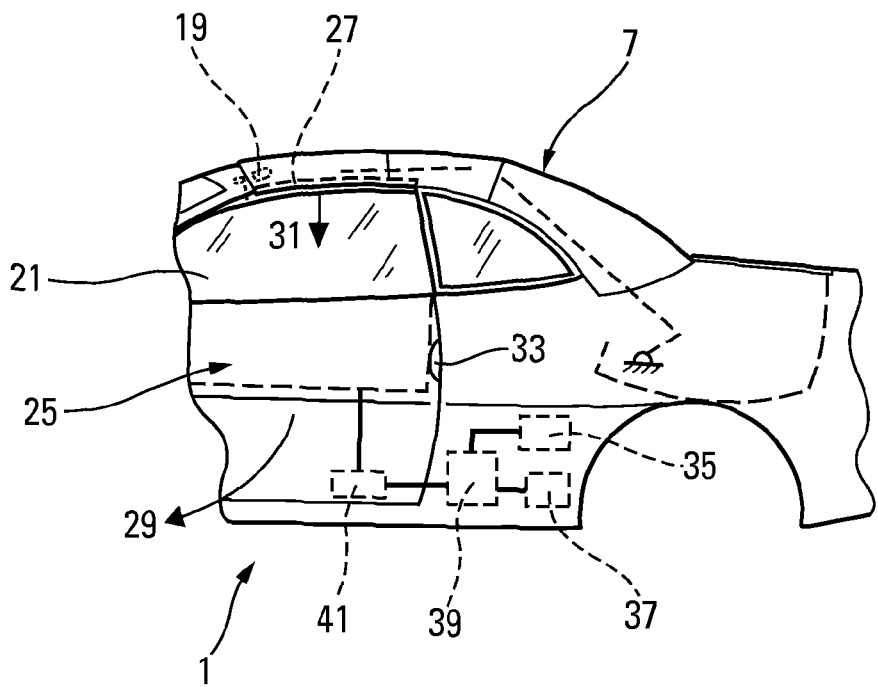

However, this local engagement of the windows in the hatched part of FIG. 1 means that before these side doors, such as the door 25, can be opened, arrow 29, the relevant window or windows has or have to be rolled down slightly as indicated by the arrow 31 in FIG. 2.

The invention takes account of this situation and makes it possible simultaneously to detect that somebody is approaching the vehicle and move the relevant part 21a of the window clear of the groove 27 before the relevant door is opened, for example by action on the lock handle system 33.

In order, in this example, therefore to ensure this entirely safe opening of the door 25 without damaging either the roof or the window 21, it is proposed that the vehicle be provided with a first motion detector 35 of the contactless type supplemented by a second detector 37.

This second detector 37 is typically a proximity or contact detector of capacitive type with a far lower electrical power consumption than the first detector 35, at least when the latter detector is in its operational state, that is to say ready to or acting to move the window or windows concerned appropriately, as in the example given here.

Of course, each detector will therefore be sensitive to the presence or to an action of an individual wishing to bring about the event concerned, such as, in this instance, to enter the vehicle while this vehicle has its doors and side windows closed and its roof up.

The two detectors 35, 37 are coupled to one another and connected to the central data control and processing unit 39 which may be provided for coordinating all the data that may be supplied by various sensors.

If appropriate via this sensor unit 39, the detectors 35, 37 are connected to the electric motor 41 designed to roll the window 21 up and down at will.

It will thus in particular be possible at least to alleviate the problem of the typical sensitivity of proximity sensors and/or capacitive sensors which, like the second detector 37, are particularly sensitive to water impinging on the vehicle, particularly on its bodywork, with the risk that the detector will send out information to roll the windows down, this information being liable to be to the detriment of watertightness, for example in heavy rain or when a vehicle is going through a car wash.

It will therefore have been understood that the first detector 35, although it draws a fairly significant amount of power in its operational state, it is, on the other hand, designed to be less sensitive to any water which may drip or be sprayed onto the vehicle.

It will preferably be a motion detector of the contactless type.

In order to minimize the effect with regard to mechanical tolerances, this first detector 35 will preferably be of a magnetic type, for example a Hall effect sensor which is very stable in the environmental conditions anticipated for the application in question, in this instance a motor vehicle. It will typically be stable with respect to the temperature conditions encountered.

When it is also coupled to the other sensor 37 in such a way that the first detector 35 is often, or even essentially, in the standby state and is "woken up" by the second detector 37, that always remains operational, only when an approach has been detected, then the data needed to be transmitted to the motor 41 in order to roll the window 21 down before the door 25 is opened, or can be opened, will be transmitted only if both sensors have reacted and have transmitted detection information.

Outside of these periods for which the second detector 37 is transmitting such information, the first detector 35 will therefore be placed in a standby state in which its electrical power consumption is lower than the power consumption of its operational state, thus making the recommended solution even more reliable.

According to its intrinsic features, the first detector 35 will be placed in this standby state either of its own accord after a predetermined period of it and/or of the second detector 37 not detecting anything, or via this second detector, the data needed for this and/or the time delay needed being provided via the central control unit 39 and its clock (not depicted).

Thus, when the door 25 is opened by action on the handle 31, the window 21 is in the slightly rolled down position, not at the end of its stroke.

From there, the occupant who has entered the vehicle will of course be able to roll each window, including the window 21, up and down at will.

When the occupant leaves the vehicle it can also be reckoned that, assuming that the roof 7 is still up, the closing-up of the vehicle, for example using a known central locking system, will, when necessary, cause said windows 21 to be rolled back up slightly until they once again fit into the relevant grooves 27 provided therefore.

There are various possible locations for the first detector 35 and the second detector 37. They may, in particular and as a preference, be built into the door handle 33 of the vehicle.

It is even possible for the central control unit 39 also to be partially or fully built into this. To do this, the central control unit 39 can be split into two parts, one controlling the electric motor 41 and the other connected to the detectors 35 and 37. The part in connection with the detectors can then be installed in the door handle 33 of the vehicle.

An alternative embodiment involves building the first detector 35 into the door opening/closure mechanism located in the door 25 and the second detector 37 into the door handle 33.

The invention claimed is:

1. A roof-clearing device for moving side windows (21) of a convertible vehicle (1) to an appropriate distance clear of a roof (7) hinged to the body (3) of said convertible vehicle (1), said device being capable of detecting an event in the vehicle or in the surroundings of the vehicle, comprising:
   a contactless magnetic motion-sensing first detector (35) configured to occupy two states:
      a first operational state in which the first detector (35) initiates, or is ready to initiate, control of an operation, and
      a second standby state in which an electrical power consumption of the first detector (35) is lower than an electrical power consumption of the first detector in the first operational state; and
   a capacitive proximity or contact sensing second detector (37), coupled to the first detector and configured to consume less electrical power than the first detector when the first detector is in the first operational state,
   each of said first detector (35) and said second detector (37) being sensitive to a presence or to an action of an individual capable of bringing about said event, the second detector (37) also being sensitive to water falling or sprayed onto the vehicle (1),
      wherein, with the first detector (35) in the standby state, if the second detector (37) detects, within the surroundings of the convertible vehicle (1) an event to which the second detector (37) is sensitive, then the first detector switches into the operational state,
   wherein if, while the first detector is in the operational state, the first detector (35) detects said presence, intervention or action of said individual, then the first detector, via a motor, causes the windows to be rolled down clear of the roof before the door (31) is either of opened or becomes openable, and
   wherein the first detector (35) is less sensitive to water falling or sprayed onto the vehicle (1) than the second detector (37).

2. The device as claimed in claim 1, wherein the first detector (35) is placed in the standby state either of its own accord after remaining a predetermined period of time without detecting, or via the second detector (37).

3. The device as claimed in claim 1, wherein the first detector (35) and the second detector (37) are built into a door handle (33) of the vehicle.

4. The device as claimed in claim 1,
   wherein the first detector (35) is built into a door opening/closing mechanism of the door (25), and
   wherein the second detector (37) is built into a door handle (33) of the vehicle.

5. A roof-clearing device for moving a window of a side door of a vehicle clear of a roof of the vehicle, said device comprising:

a contactless, motion-sensing first detector (35), configured to occupy one of i) a high-power operational first state, and ii) a low-power standby second state in which an electrical power consumption of the first motion detector (35) is lower than a power consumption of the first detector (35) in the operational first state; and a proximity or contact sensing second detector (37) coupled to the first detector, the second detector (37) configured to consume less power in operation than said first detector when in the operational first state, each of said first detector (35) and said second detector (37) being operatively sensitive to at least one of a presence and an action of a user of the vehicle, the second detector (37) also being operatively sensitive to water impinging upon the vehicle (1), and the first detector (35) being less sensitive to water impinging onto the vehicle (1) than the second detector (37), wherein, upon the second detector (37) detecting an event to which the second detector is sensitive, the first detector exits the standby second state and enters the operational first state, and upon the first detector, in the first operational state, detecting an event to which the first detector is sensitive, the first detector causes the window, via a motor, to lower by a distance sufficient from the roof of the vehicle for the door of the vehicle to be opened.

6. The device as claimed in claim 5, wherein the first detector is a contactless magnetic detector.

7. The device as claimed in claim 6, wherein the second detector is a capacitive detector.

8. The device as claimed in claim 5, wherein the first detector exits from the operational first state and enters the standby second state predetermined period of time free of detection of any event by either of the first detector and the second detector.

9. The device as claimed in claim 5, wherein the first detector and the second detector are built into a door handle of the door of the vehicle.

10. The device as claimed in claim 5,
wherein the first detector is built into a door opening/closing mechanism of the door, and
wherein the second detector is built into a door handle of the vehicle.

* * * * *